May 15, 1956 S. I. SHAFER ET AL 2,745,750
MARGARINE AND METHOD OF MAKING IT
Filed Oct. 10, 1951 3 Sheets-Sheet 1

INVENTORS
STANLEY I. SHAFER
ARNE R. GUDHEIM
WERNER H. SCHMIDT
BY
Campbell, Brumbaugh, Free & Graves
ATTORNEYS INVENTORS
STANLEY I. SHAFER
ARNE R. GUDHEIM
WERNER H. SCHMIDT
BY Campbell, Brumbaugh, Free & Graves
ATTORNEYS

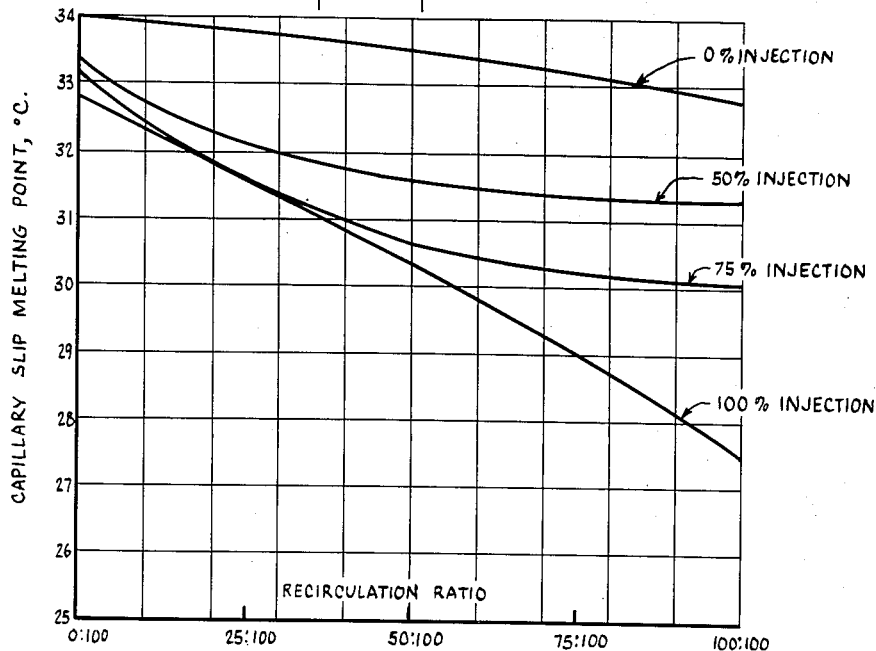
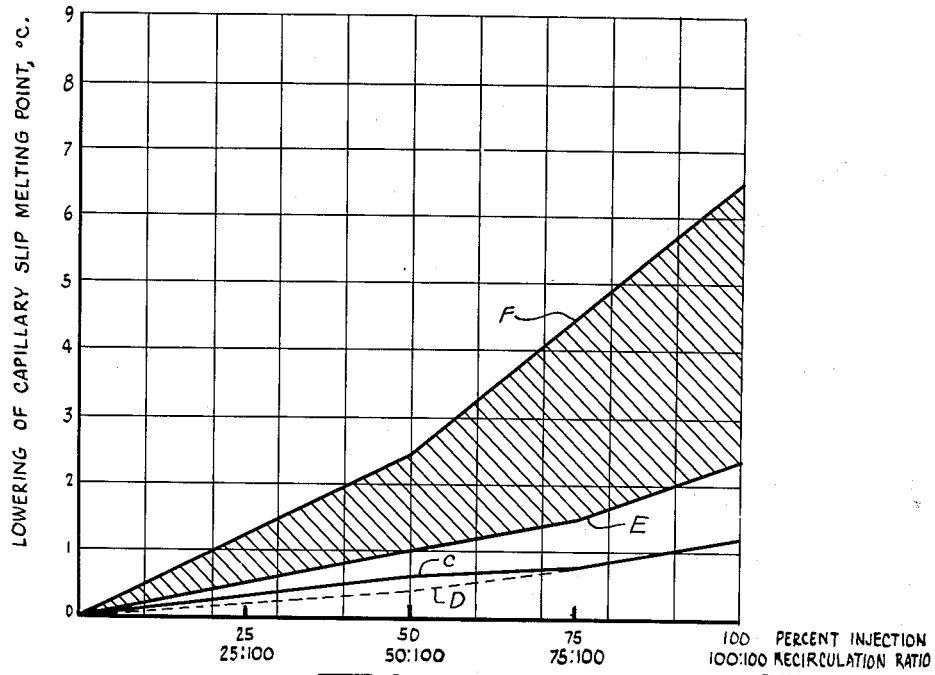

United States Patent Office 2,745,750
Patented May 15, 1956

2,745,750

MARGARINE AND METHOD OF MAKING IT

Stanley I. Shafer, Melrose, and Arne R. Gudheim, Petersham, Mass., and Werner H. Schmidt, Englewood, N. J., assignors to Lever Brothers Company, New York, N. Y., a corporation of Maine Application October 10, 1951, Serial No. 250,606

6 Claims. (Cl. 99—122)

This invention relates to an improved margarine and to a method of making it.

Basically, margarine is made by admixing and emulsifying fat with an aqueous ingredient, solidifying the emulsion, and then packaging the resulting product.

The term "fat," as understood in the art and used herein, includes rendered animal fat, or oil or stearin derived therefrom, any or all of which may be hydrogenated; any vegetable food fat or oil, or stearin derived therefrom, any or all of which may be hydrogenated; and any combination of such ingredients.

The term "aqueous ingredient" is generally understood in the art, and is so used herein, to include cream, milk, skim milk, a combination of dried skim milk and water, and any mixture of two or more of these materials.

Formerly, the solidification was accomplished by spraying the emulsified mixture into a trough or vat of water maintained at a temperature in the immediate vicinity of the freezing point. This method had a number of important disadvantages in that it resulted in a washing out of a portion of the mlik, occluding in the emulsion an uncertain amount of cooling water, exposing the emulsion to air-borne and water-borne bacterial contamination, and being wasteful of refrigeration.

Subsequently, a method was developed and widely adopted wherein the emulsified materials are solidified by contact with the exterior surface of an internally cooled rotating drum or chill roll. This method likewise suffers from the disadvantages of exposing the emulsion and the chilling surface to air-borne bacterial contamination and being wasteful of refrigeration.

More recently, the trend has been to utilize a closed chilling apparatus, such as that generally known as the "Votator" or "A" unit, in the solidification of the emulsion. This apparatus comprises one or more thin walled nickel tubes surrounded by a cooling medium such as evaporating liquid ammonia and provided with rapidly rotating internal blades. The emulsion passing through the apparatus is supercooled and maintained in a liquid condition by the agitation of the blades. Upon leaving the chilling apparatus, the supercooled emulsion may be subjected to screening, is solidified and finally, printed and wrapped.

It has been the constant aim of margarine manufacturers to produce a product having a texture, spreadability, general appearance and flavor closely resembling that of butter. At room temperature, butter is both readily spreadable and brittle, i. e., a print breaks rather than bends and the surfaces at the break has a crumbly appearance. In margarine, these two attributes have been obtainable separately but not together. Margarine products that are readily spreadable have a greasy texture and are therefore not brittle. Margarine products that have the desired brittleness are not readily spreadable.

It has now been found possible to produce a margarine having both a brittleness and spreadability practically indistinguishable from that of butter. The new product, as compared with prior margarine products, has a somewhat coarser texture, grainy structure, and an improved feel on the palate that is instantly apparent.

The feel of margarine on the palate is indicated by its capillary slip melting point, a high capillary slip melting point being indicative of an unpleasant greasy feel and a lower slip melting point being indicative of the ability of the material to melt quickly upon contact with the tongue. The capillary slip melting point (described in Bailey, "Melting and Solidification of Fats," 1950, pp. 79–80), as the name implies, is measured by immersing, one at a time in containers of water maintained at an ascending series of temperatures, capillary tubes containing the product and noting the temperature of the water which causes the product to slip upward ⅛″ in the capillary tube within 20 seconds due to the hydrostatic head and the softening of the product. The improvement in margarine obtained in accordance with the present invention is indicated by the fact that the capillary slip melting points of margarine produced in accordance with the method of the invention are several degrees C. lower than those obtainable with the same starting materials by conventional Votator methods. Whereas the capillary slip melting points of margarines made by the conventional Votator process have consistently been within about 1.5° C. of the Wiley melting point of the initial fat, the slip melting point of margarine made by the method of this invention is at least 3° C. below the Wiley melting point of the initial fat. The Wiley melting point is well-known in the art and is discussed in the aforementioned text of Bailey, page 111.

Essentially the method of this invention includes the steps of subjecting a continuous stream of fat alone or fat emulsified with less than the final proportion of aqueous ingredients to mild cooling and agitation to precrystallize the higher melting glycerides in the fat, rapidly chilling and agitating the cooled stream and then continuously injecting into and blending with the chilled stream all or the remainder of the aqueous ingredients prior to the finishing operations, such as screening, setting, printing and wrapping.

A continuous stream of stock comprising all of the fat and up to about 95%, preferably of the order of about 25 to 50%, of the total requirements of aqueous ingredients is subjected to mild cooling and agitation in order to precrystallize the high melting glycerides in the fat. This step is preferably carried out in a picker box or so-called "B" shortening unit, which in essence consists of one or more cylinders provided with beaters to maintain the contents in a moderate degree of agitation, as described, for example, in Bailey, "Industrial Oil and Fat Products" (1945), page 703.

The cooling may be accomplished by any suitable means. In the preferred embodiment of this invention, the initial stream of stock is cooled by admixing it with a continuous stream of recycled and supercooled material shortly to be described. Optimum precrystallization temperatures, depending upon the particular fat or fats utilized, range from about 73 to 93° F. These temperatures are somewhat higher than the temperatures to which the stock is cooled for precrystallization because of the heat of crystallization that is liberated during the crystallization process.

Upon leaving the precrystallization unit the continuous stream of material is subjected to rapid chilling and agitation, preferably in a votator or "A" unit. In this step the high melting glycerides precipitated during the precrystallization step form the nuclei for crystal formation.

All or the balance of the aqueous ingredients are cooled, preferably to a temperature of the order of about 20 to 30° F., and continuously injected into and blended with the supercooled material from the chilling unit and the resulting mix is subjected to screening, printing and wrapping, the printing and wrapping preferably being carried out with a Wilson compensator, such as described and illustrated in U. S. Patent 2,474,136, preceding the molding head of the print former and the wrapping machine.

When the cooling of the initial stream of stock to effect precrystallization is carried out by admixing it with a recycled stream of supercooled material, the aqueous ingredients are preferably injected into the stream of supercooled material at a point after the bleed-off point for the recycled material and the ratio by weight of recycled material to initial stock may vary widely, depending upon the precrystallization temperature of the higher melting glycerides in the particular fat initially used, the initial temperature of the stock entering the system and the temperature of the supercooled material leaving the chilling unit. The maximum amount of recycled material is dependent upon the capacity of the chilling unit in relation to the production rate of margarine that is desired. Thus, for example, while it is entirely feasible to recycle, say 75% or more of the supercooled material leaving the chilling unit, so that the ratio of recycled material to initial stock will be 3:1 or higher, such a high rate of recycling is not desirable for the reason that it reduces the production rate of margarine to a small fraction of the capacity of the chilling unit. On the other hand, the ratio of recycled material to initial stock should, in the circumstances, be at least high enough to cool the initial stock sufficiently to effect precrystallization of the higher melting glycerides. Therefore, when the recycled material is utilized as the sole coolant inducing precrystallization, it is usually preferred, in order to arrive at a desirable balance between amount of precrystallization and economy of operation, to maintain the ratio of recycled to initial material between about 10:100 and 150:100.

It is to be understood, of course, that when other cooling means are utilized in place of recycling to effect precrystallization, recycling is unnecessary and that when such other cooling means are used in conjunction with recycling, the ratio of recycled to initial material may be lower than 10:100 and approach 0:100.

The method of the invention and the uniqueness of the product obtained thereby will become more apparent from the following detailed description made with reference to the accompanying drawing wherein:

Fig. 4 is a graph similar to Fig. 3 but representing the capillary slip melting point characteristics of the products after aging for an additional four weeks at 50° F.; and Fig. 5 is a graph, based on Fig. 4, showing the synergistic effect produced by combining precrystallization and injection in the method of this invention.

Figure 1:
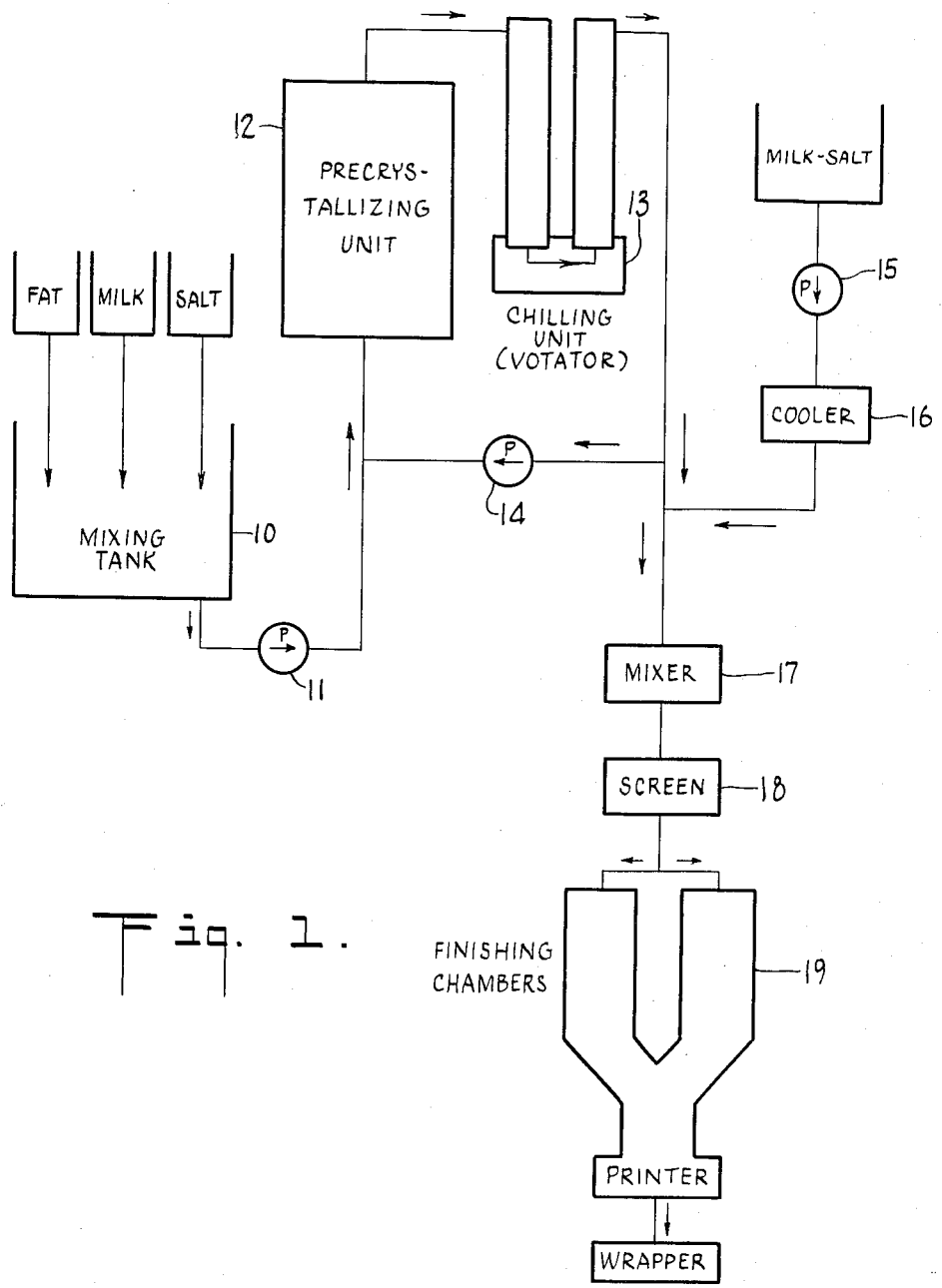
Fig. 1 is a schematic flow sheet illustrating a preferred embodiment of the method.

Referring now to Fig. 1 of the drawing, all of the fat and part of the milk and salt utilized in the process are introduced, in the proper preselected proportions, into a mixing tank 10, wherein the ingredients are emulsified. The emulsified materials are then pumped by means of a pump 11 through a precrystallizing or "B" unit 12 and a chilling unit such as a "Votator" or "A" unit 13. A preselected proportion of the chilled materials leaving the chilling unit 13 is recycled, by means of pump 14, for addition to the initial emulsion prior to entry thereof into the precrystallization unit 12. The balance of the total requirements of milk and salt is pumped, by means of a pump 15, through a cooler 16 and injected into the supercooled emulsion from the chilling unit 13 after a portion of the supercooled emulsion has been withdrawn for recycling. The supercooled emulsion and injected milk and salt are then thoroughly admixed in a mixer or blender 17, subjected to mild working in a screen 18 and passed to finishing chambers 19 for printing and wrapping, as indicated.

It will readily be understood by those skilled in the art that other ingredients, such as emulsifying agent, preservative, vitamins, antispattering agent, flavoring material, coloring material and the like, some of which are essential and others of which are optional ingredients, may be added in such proportions and at such stages in the process as are well known in the art.

*Example*

2400 lbs. of fat having a Wiley melting point of 35.5° C. were admixed in a mixing tank with 22½ lbs. of salt and 127.5 lbs. of milk. The resulting emulsion was pumped by means of a feed pump through a "B" unit for precrystallization and then through a Votator or "A" unit for rapid chilling and agitation. A portion of the chilled emulsion leaving the chilling unit was recycled by means of a pump at a rate of 50 lbs. of chilled emulsion for every 100 lbs. of warm emulsion supplied by the feed pump. 67.5 lbs. of salt and 382.5 of milk were pumped through a cooler, injected into the remainder of the stream of chilled emulsion and blended therewith. The milk pump was controlled so that the finished product had the required moisture content, never containing less than 80% fat. The blended mixture was then subjected to screening in a thimble screen and directed to a Wilson compensator, print former and wrapping machine for printing and wrapping.

After the operations had reached equilibrium conditions, the temperatures of the emulsion in the various stages were found to be 98° F. in the mixing tank, 85° F. at the entrance to the chilling unit and 40° F. at the exit of the chilling unit. The milk-salt solution was initially at a temperature of 50° F. and was reduced to 30° F. in the milk cooler. The temperature of the print was 60° F.

The product was found to have a capillary slip melting point of 30.5° C. Macropenetrations, mm./10, obtained with a standard cone-shaped, shortening penetrometer needle at 10° C., 21° C., and 26° C. were found to be 88, 235 and 393, respectively. By way of comparison, the identical process, except for the fact that all of the milk and salt was added initially, resulted in a margarine product having a capillary slip melting point of 33.6° C. and corresponding macropenetrations, mm./10, of 80, 204 and 383. This comparison shows the product of this example to be somewhat softer than that obtainable with the same initial margarine base stock wherein the ratio of recycling is the same but the milk injection is eliminated. More important, from the point of view of feel of the margarine on the palate, is the fact that the capillary slip melting point of the product of this invention is 30.5° C. as compared to 33.6° C. for the comparable product. This is surprising in view of the widespread belief in the art that the consistency of margarine is dependent principally upon the fats initially used in its manufacture and is influenced but little by ordinary variations in methods of solidifying and emulsifying the product.

The same base stock and the same final proportions of fat, milk and salt as utilized in the example were used to prepare a number of additional quantities of margarine while (a) adjusting the degree of precrystallization by varying the ratio of recycled chilled emulsion to initial emulsion between 0 and 100:100, and (b) varying the amount of milk injected after chilling between 0 and 100% of the total milk content.

A total of twelve products, including that of the example, thus made were tested for capillary slip melting point. The results of these tests are illustrated in the graphs of Figs. 2 to 5, inclusive.

Figure 2:
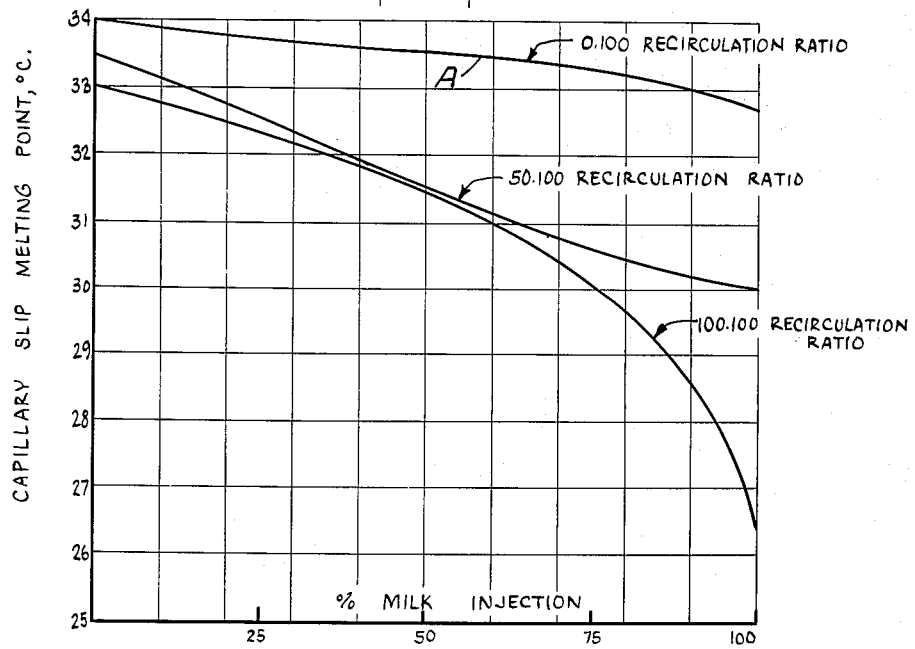
Fig. 2 is a graph showing the effect exerted on the capillary slip melting point of the finished margarine after aging for two weeks at 50° F., by varying the percentage of aqueous ingredients injected into and blended with the supercooled emulsion.
Figure 3:
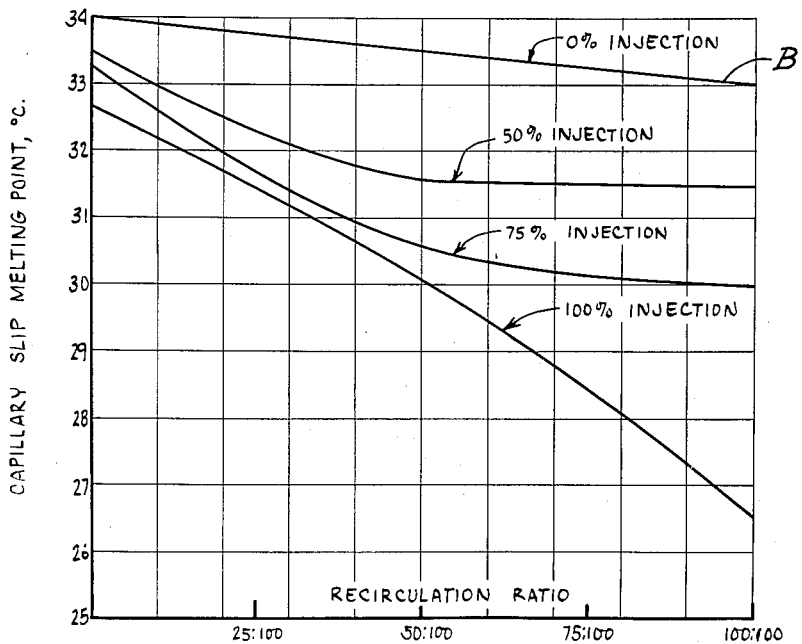
Fig. 3 is a graph showing the effect exerted on the capillary slip melting point of the finished margarine, after aging for two weeks at 50° F., by varying the degree of precrystallization effected by in turn varying the ratio of recycled emulsion to initial emulsion.

It appears from curves A and B of Figs. 2 and 3 that the capillary slip melting point of the margarine produced without either precrystallization or milk injection is 34° C. Curve A shows the maximum reductions in capillary slip melting point obtainable by 50%, 75% and 100% milk injection alone to be 0.5, 0.7 and 1.3° C., respectively. It likewise appears from curve B of Fig. 3 that the maximum reductions in capillary slip melting point obtainable solely by increasing the amount of precrystallization due to increases in the recirculation ratio to 50:100 and 100:100 are 0.5 and 1° C., respectively.

While it is thus to be expected that the maximum reduction in capillary slip melting point obtainable by 100% injection and precrystallization due to 100:100 recirculation would be the arithmetic sum of 1.3 and 1.0, or 2.3° C., it was actually found that such a combination of injection and precrystallization resulted in the reduction of the capillary slip melting point from 34 to 26.5° C., or a total of 7.5° C.

Samples of the products thus made and tested were stored at 50° F. for four additional weeks and again tested for capillary slip melting points. The results of these tests are shown in the graph of Fig. 4. It is apparent, from a comparison of the graphs in Figs. 3 and 4, that the products of the invention have eminently satisfactory stability under 50° F. storage conditions.

The synergistic effect of combining milk injection with precrystallization induced by recirculation, and the permanence thereof, are best illustrated in the graph of Fig. 5, wherein curves C and D represent the effects of injection alone and of precrystallization and recirculation alone, respectively. Curve E represents the arithmetic sum of curves C and D, and curve F represents the actual combined effect, in six-week old samples, of injection and precrystallization by recirculation.

It is to be understood, of course, the numerous variations and modifications will suggest themselves to those skilled in the art on reading this description. All such variations and modifications are intended to be included within the scope of the invention as defined in the appended claims.

We claim:

1. A method of making margarine which comprises mildly cooling and agitating the initial fat stock to precrystallize the higher melting glycerides therein, rapidly chilling and agitating the stock to supercool it, and blending at least part of the aqueous ingredient with the supercooled material.

2. The method defined in claim 1 wherein the aqueous ingredient blended with the supercooled material is cooled before blending.

3. The method defined in claim 1 wherein the initial fat stock subjected to cooling for precrystallization is an emulsion of the total fat requirements with part of the total requirements of aqueous ingredient.

4. The method defined in claim 1 wherein the cooling of the emulsion to precrystallize the higher melting glycerides is accomplished by recycling a portion of the supercooled emulsion and bringing it into contact with the initial emulsion.

5. The method defined in claim 4 wherein the ratio by weight of recycled emulsion to initial emulsion is between about 10:100 and about 150:100.

6. A brittle, readily spreadable margarine product having a capillary slip melting point at least about 3° C. below the Wiley melting point of the fat utilized as the major initial ingredient.

References Cited in the file of this patent
UNITED STATES PATENTS

| | | |
|---|---|---|
| 2,098,010 | Newton et al. | Nov. 2, 1937 |
| 2,434,429 | Nelson | Jan. 13, 1948 |